United States Patent [19]

Bitschkus et al.

[11] Patent Number: 5,582,394
[45] Date of Patent: Dec. 10, 1996

[54] ELASTIC MOUNT AND METHOD FOR PRODUCING ELASTIC RUBBER BODIES THEREFOR

[75] Inventors: Horst Bitschkus, Hilgert; Carsten Schulze, Wolfsburg, both of Germany

[73] Assignee: Metzeler Gimetall AG, Munich, Germany

[21] Appl. No.: 270,381

[22] Filed: Jul. 5, 1994

[51] Int. Cl.$^6$ ............................................. F16M 1/00
[52] U.S. Cl. ............................................. 267/140.12
[58] Field of Search .................. 264/176.1; 180/300, 180/312; 248/560, 562, 603, 638; 267/294, 181, 292, 140, 140.12, 146.11, 140.4, 141, 141.3, 141.4, 153

[56] References Cited

U.S. PATENT DOCUMENTS

| | | | |
|---|---|---|---|
| 4,546,848 | 10/1985 | Iijima | 180/312 |
| 4,913,410 | 4/1990 | Marshall | 267/153 |
| 4,958,812 | 9/1990 | Wolf | 267/294 |
| 4,981,287 | 1/1991 | Cothenet | 267/292 |
| 5,221,392 | 6/1993 | Mai | 156/184 |
| 5,295,671 | 3/1994 | Nakagaki | 267/140.13 |
| 5,326,508 | 7/1994 | Kaefer | 264/28 |

*Primary Examiner*—Robert Loberleitner
*Assistant Examiner*—C. T. Bartz
*Attorney, Agent, or Firm*—Herbert L. Lerner; Laurence A. Greenberg

[57] ABSTRACT

An elastic mount, particularly for supporting drive assemblies in motor vehicles, includes a housing being open toward an engine and secured to a rigid abutment. A support arm protrudes laterally from the drive assembly and is supported on the rigid abutment by elastomer bodies. The support arm has an approximately cross-shaped cross section and laterally obliquely projecting ribs. Elongated rubber bodies are cut from a continuous extrudate and having a prismatic cross section. The rubber bodies are inserted between the ribs for vertical and horizontal support and are enclosed by the housing. A method for producing elastic rubber bodies for an elastic mount for supporting drive assemblies, includes extruding rubber bodies with a predetermined cross section as continuous extruded profiles made of an elastomer, vulcanizing the rubber bodies, and then dividing the rubber bodies into a predetermined length of individual rubber bodies.

23 Claims, 5 Drawing Sheets

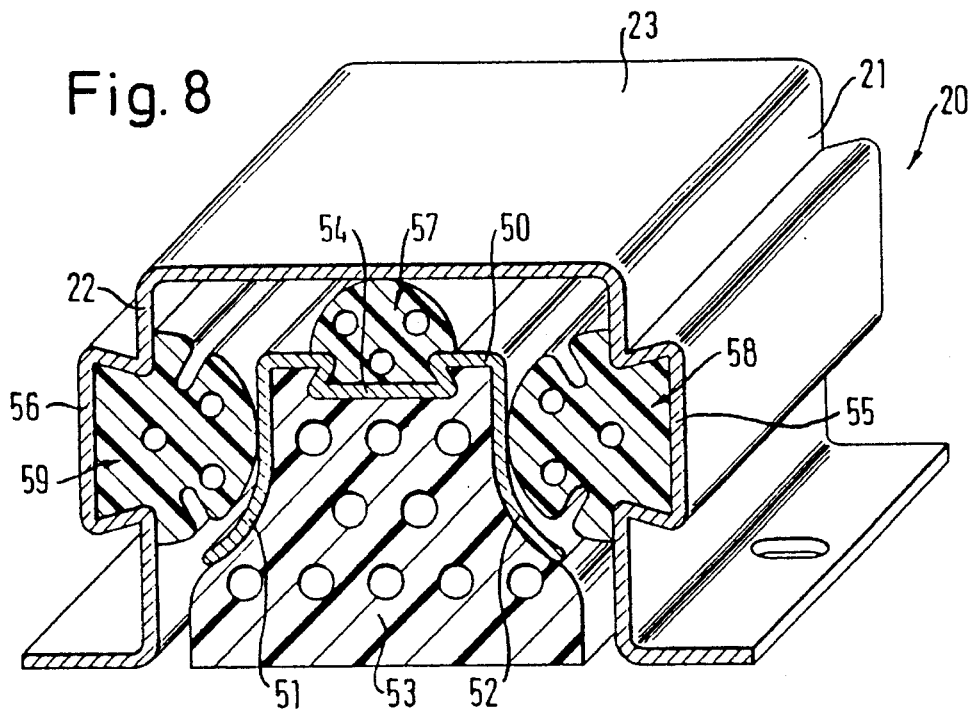
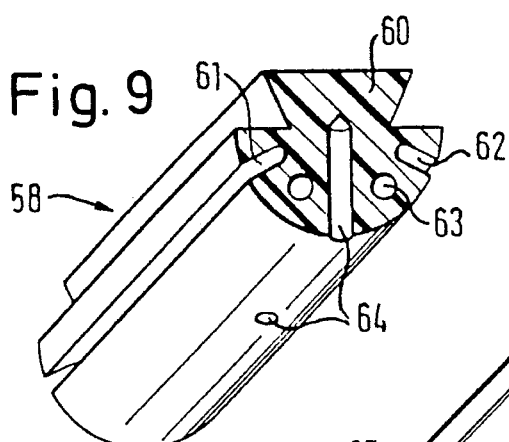
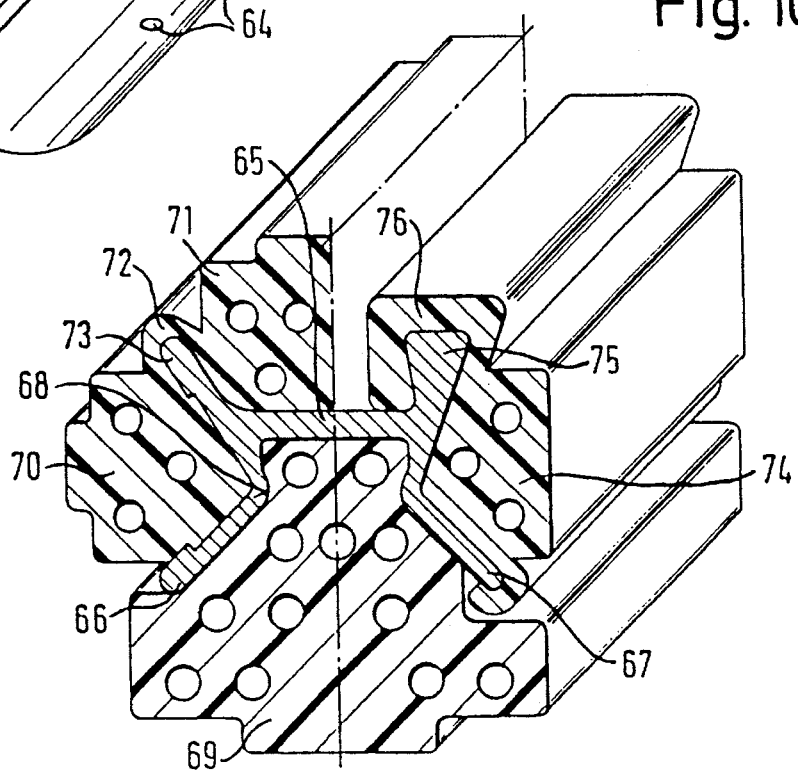

ELASTIC MOUNT AND METHOD FOR PRODUCING ELASTIC RUBBER BODIES THEREFOR

BACKGROUND OF THE INVENTION

1. Field of the Invention

The invention relates to an elastic mount, particularly for supporting drive assemblies in motor vehicles, with a support arm protruding laterally from the drive assembly and being supported on a rigid abutment by elastomer bodies. The invention also relates to a method for producing elastic rubber bodies for the elastic mount.

Such engine mounts are known in the form of so-called block mounts in which two rubber bodies that are oblique relative to one another are vulcanized in place between an upper and a lower support that are usually formed of metal. Aside from having little opportunity for varying the spring rigidity, such mounts have the disadvantage, which is now substantial, of being practically unrecycleable, or only being recycleable with major effort, since the metal cannot be separated from the rubber except with difficulty.

SUMMARY OF THE INVENTION

It is accordingly an object of the invention to provide an elastic mount and a method for producing elastic rubber bodies therefor, which overcome the hereinafore-mentioned disadvantages of the heretofore-known devices and methods of this general type, in which the spring rigidity can be adjusted easily over wide ranges and with broad capabilities of variation with simple means and which moreover have an optimal capacity for recycling.

With the foregoing and other objects in view there is provided, in accordance with the invention, an elastic mount, particularly for supporting drive assemblies in motor vehicles, comprising a housing being open toward an engine and secured to a rigid abutment; a support arm protruding laterally from the drive assembly and being supported on the rigid abutment by elastomer bodies, the support arm having an approximately cross-shaped cross section and laterally obliquely projecting ribs; and elongated rubber bodies being cut from a continuous extrudate and having a prismatic cross section, the rubber bodies being inserted between the ribs for vertical and horizontal support and being enclosed by the housing.

Thus for resilient support and for stops, rubber bodies are used that are cut to length from continuous, separately extruded profile sections and inserted into the appropriate retainer, from which they can be removed just as easily and recycled.

In accordance with another feature of the invention, in order to provide purposeful adjustment of the spring rigidity, the rubber bodies have continuous longitudinal channels.

In accordance with a further feature of the invention, the longitudinal channels are circular in cross section, with at least one Venturi-like narrowing over their length.

In accordance with an added feature of the invention, the longitudinal channels differ in diameter.

In accordance with an additional feature of the invention, the support arm has a horizontal middle rib with ribs protruding laterally and obliquely upward and downward at an angle of 30° to 60° from the horizontal, and the middle rib changes at one end into a wider retaining flange for attachment of the engine.

In accordance with yet another feature of the invention, the support arm rests on a rubber support body of rectangular cross section that is supported directly on the abutment, and the support body has a rectangular cross section and a top converging in wedge-like fashion being inserted between the laterally downward-protruding ribs.

In accordance with yet a further feature of the invention, the rubber support body has not only longitudinally extending channels but also a central, vertical recess.

In accordance with yet an added feature of the invention, in order to provide simpler manufacture, the two lateral rubber bodies, as horizontal stops, have the same cross section, protrude laterally beyond the obliquely projecting ribs, and rest with lateral extensions on the encompassing side walls of the housing.

In accordance with yet an additional feature of the invention, the upper rubber body is constructed in practical fashion as a vertical stop and protrudes with at least one extension beyond the obliquely upward projecting ribs.

In accordance with again another feature of the invention, for further simplification, the mutually opposed rubber bodies also have the same cross section and are inserted mirror-symmetrically relative to one another.

In accordance with again a further feature of the invention, in order to economize on one separate upper vertical stop, the two lateral rubber bodies each have one extension as a vertical stop that encompasses the obliquely upward-projecting rib.

In accordance with again an added feature of the invention, the two obliquely downward projecting ribs are oriented first obliquely inward and then obliquely outward and in the upper region form a dovetail-shaped indentation for the lower rubber support body.

In accordance with again an additional feature of the invention, the support arm has a horizontal middle rib with a longitudinally extending, dovetail-like indentation and two laterally downward projecting ribs for inclusion of the supporting rubber support body, the encompassing housing is provided with one dovetail-like bulge on each of its side walls, and identical extruded profiles are respectively inserted as a vertical stop and horizontal stops into the dovetail-like indentation and bulges.

In accordance with still another feature of the invention, the extruded profiles have an approximately semicircular cross section with continuous longitudinal channels and lateral indentations as well as a central dovetail base.

In accordance with still a further feature of the invention, in order to provide better holding of the rubber bodies, the laterally obliquely projecting ribs have longitudinally extending extensions converging in approximately arrowhead-like fashion, which engage corresponding undercuts in the rubber bodies.

In accordance with still an added feature of the invention, the rubber bodies may be snapped in place between the projecting ribs.

In accordance with still an additional feature of the invention, optionally the rubber bodies themselves are stuck or adhere between the ribs.

In accordance with a concomitant feature of the invention, in order to absorb vertical forces, the support arm has a transversely extending partition between the two obliquely upward projecting ribs, which is flush with the upper edge of the ribs.

With the objects of the invention in view, there is also provided a method for producing elastic rubber bodies for an elastic mount for supporting drive assemblies, which comprises extruding rubber bodies with a predetermined cross section as continuous extruded profiles made of an elastomer, vulcanizing the rubber bodies, and then dividing the rubber bodies into a predetermined length of individual rubber bodies.

Other features which are considered as characteristic for the invention are set forth in the appended claims.

Although the invention is illustrated and described herein as embodied in an elastic mount and a method for producing elastic rubber bodies therefor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 8 is a perspective view of an embodiment of a mount with horizontal stops inserted into the housing;

FIG. 9 is a perspective view of rubber bodies used in the mount of FIG. 8; and

FIG. 10 is two perspective half-views of variant mounts, in which the horizontal and vertical stops are integrally constructed.

DESCRIPTION OF THE PREFERRED EMBODIMENTS

Figure 1:
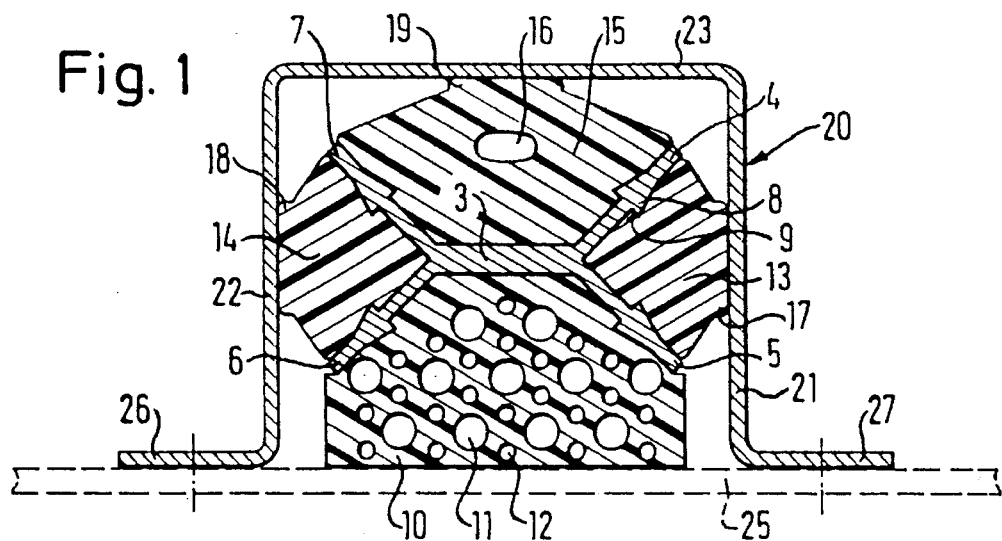
FIG. 1 is a diagrammatic, longitudinal-sectional view of an elastic mount with an approximately cross-shaped support arm.
Figure 2:
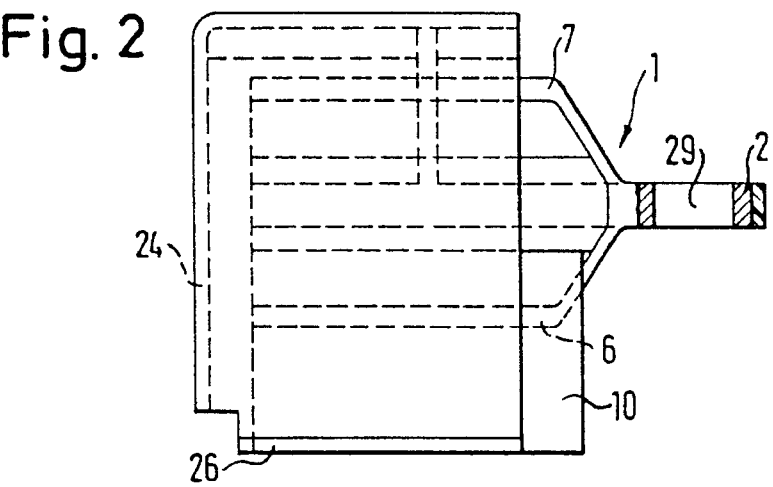
FIG. 2 is a side-elevational view of the mount of FIG. 1.
Figure 3:
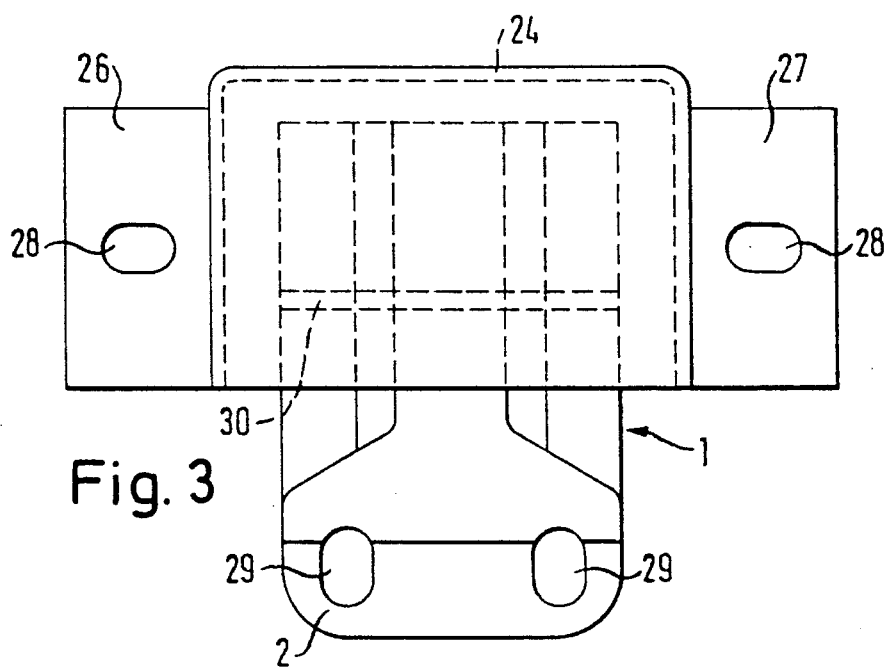
FIG. 3 is a plan view of the mount of FIG. 1.
Figure 5:
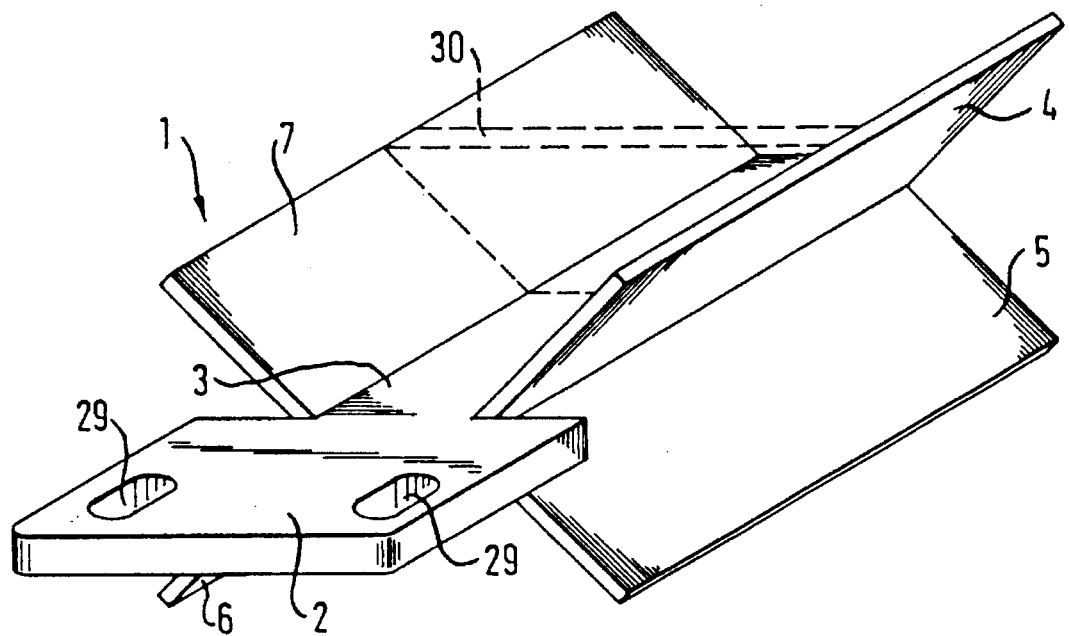
FIG. 5 is a perspective view of the cross-shaped support arm.

Referring now to the figures of the drawing in detail and first, particularly, to FIGS. 1–3 thereof, there is seen a mount that initially includes a central support arm 1 having one end which is screwed by means of a horizontal flange 2 to a non-illustrated motor vehicle engine that is to be mounted, and following this flange 2 is constructed approximately in the shape of a cross, with a horizontal middle rib 3 and ribs 4, 5, 6 and 7 projecting laterally away from the middle rib, as is also shown in detail in the perspective view of FIG. 5. These lateral ribs 4, 5, 6 and 7 can project at an angle of from 30° to 60° from the horizontal, and an angle of 45° has proved to be especially suitable.

Figure 1A:
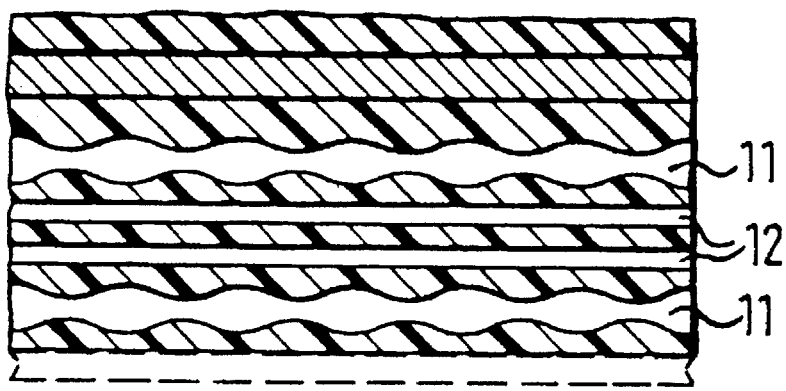
FIG. 1a is a longitudinal section through a rubber support body.

Inserted between the lower two ribs 5 and 6 is a rubber support body 10 that assumes the main support role. The rubber support body 10 essentially has a rectangular cross section with a top that converges in wedge-like fashion and is inserted between the laterally downward projecting ribs 5 and 6. In the exemplary embodiment shown, this rubber support body 10 has continuous longitudinal channels 11 and 12, which may have the same or different diameters. Moreover, it is also possible for these channels 11 or 12 to be provided over their length with one or more Venturi-like narrowings (FIG. 1a), so as to assure better transmission performance for damping structure-borne sound. Through varying the number and/or diameter of these channels 11 and 12, it is possible to adjust the spring rigidity of the rubber support body 10 in a targeted way.

Further rubber bodies 13 and 14 are respectively inserted between the lateral ribs 4 and 5, and the lateral ribs 6 and 7. The rubber bodies have identical cross sections and act as horizontal stops. These rubber bodies may also be provided with longitudinal channels corresponding to the channels 11 and 12.

A further rubber body 15, which acts as a vertical stop, is inserted on the top, between the upward projecting ribs 4 and 7. In the exemplary embodiment shown herein, this rubber body 15 has only one longitudinal channel 16 of elliptical cross section, but in this case as well, a plurality of longitudinal channels that are constructed differently, may also be provided.

This configuration of the cross-shaped support arm 1 and the four rubber bodies 10, 13, 14 and 15 is then surrounded by a housing 20, that is open on the side toward the engine. The housing 20 is also shown separately in perspective in FIG. 4. This housing 20, with its side walls 21 and 22, top 23 and closed rear wall 24, is screwed to a longitudinal member 25 of the motor vehicle, and the rubber support body 10 also rests directly and is supported on this member, which is shown in dashed lines.

Figure 4:
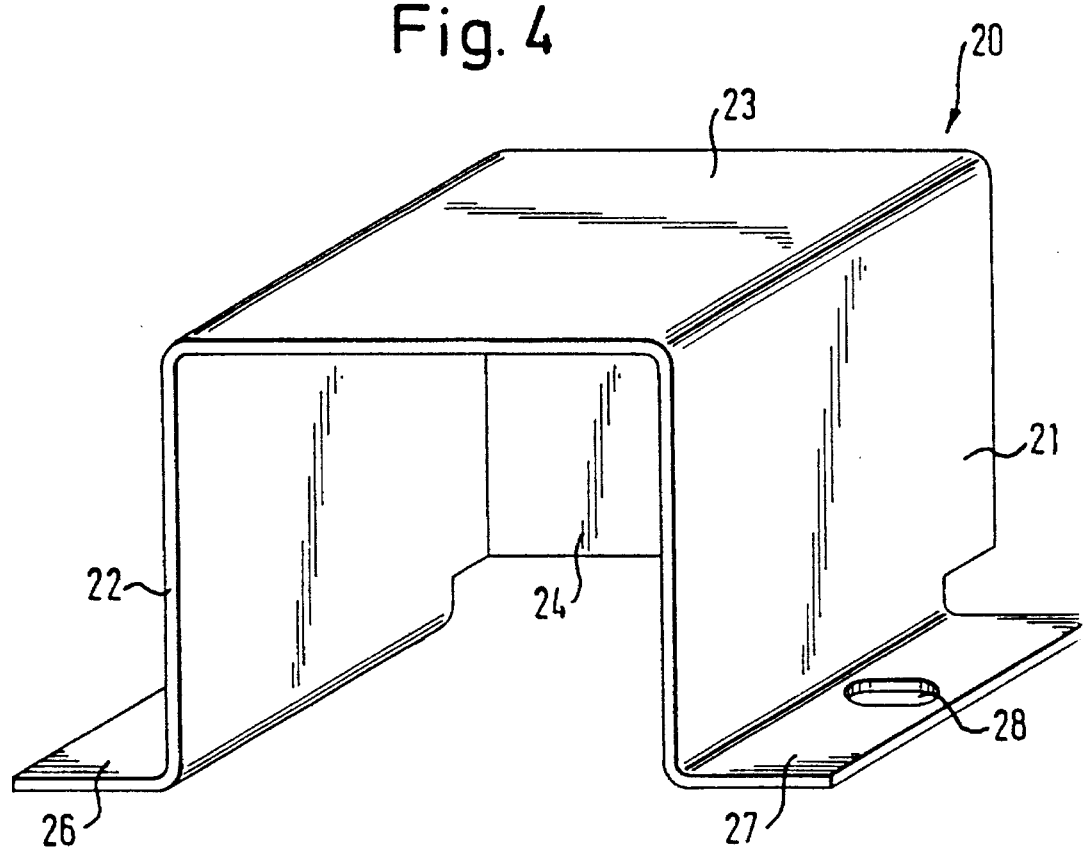
FIG. 4 is a perspective view of a housing encompassing the mount.

As is seen from FIG. 4 together with FIG. 1, the two lateral rubber bodies 13 and 14 have extensions 17 and 18 which rest against the side walls 21 and 22, and the rubber body or vertical stop 15 has an extension 19 which rests on the top 23 of the housing 20.

The production of the rubber bodies 10, 13, 14 and 15 is an essential factor in the construction of this mount. They are extruded continuously from an elastomer in the particular cross section which is desired, in the form of endless extruded profiles, and at the same time the longitudinal channels are formed by means of suitable inserts in the mouthpiece of the extruder. Next, these elastomer extrusions are vulcanized and can then be cut to the proper length for the individual rubber bodies.

The rubber bodies which are produced in this way are simply snapped in place between the ribs 4, 5, 6 and 7 of the support arm 1, since the individual ribs are provided with longitudinally extending extensions 8 that converge in arrowhead-like fashion and engage corresponding undercuts 9 in the rubber bodies 10, 13, 14 and 15 and thus afford a hold to prevent them from falling out on the side.

Once the service life of the mount has elapsed or if any damage should occur, these rubber bodies can easily be removed from the support arm again and replaced or recycled.

FIG. 4 again shows the housing 20 in perspective, with the side walls 21 and 22, the top 23 and the closed rear wall 24, which is fixed to the longitudinal vehicle member 25 by the laterally projecting flanges 26 and 27 through corresponding oblong slots, and thus brings about a limitation of motions of the mount in the horizontal and vertical directions.

FIG. 5 again shows the perspective view of one possible embodiment of the support arm 1. The laterally obliquely projecting ribs 4, 5 and 7 as well as the rib 6 which is hidden in this view, protrude from the horizontal middle rib 3 of the support arm 1. As is seen particular from this view together with FIG. 2, the nearly cross-shaped part of the support arm 1 is longer than the depth of the housing 20 and protrudes from the open side at the front, where it changes into the widened flange 2 with corresponding fastening holes 29 for fixation to the engine.

The ribs 4, 5, 6 and 7 protruding in the form of a cross are somewhat narrower in their total width than the internal diameter of the housing 20, since the corresponding rubber bodies 10, 13, 14 and 15 protrude laterally beyond the ribs themselves, so as to effect a resilient support with respect to the housing 20.

In addition, a transversely extending partition 30 protruding beyond an upper edge of these ribs may be provided between the two upper ribs 4 and 7. The partition ends with the upper edge of the ribs 4 and 7, so as to absorb vertical forces as well.

Figure 6:
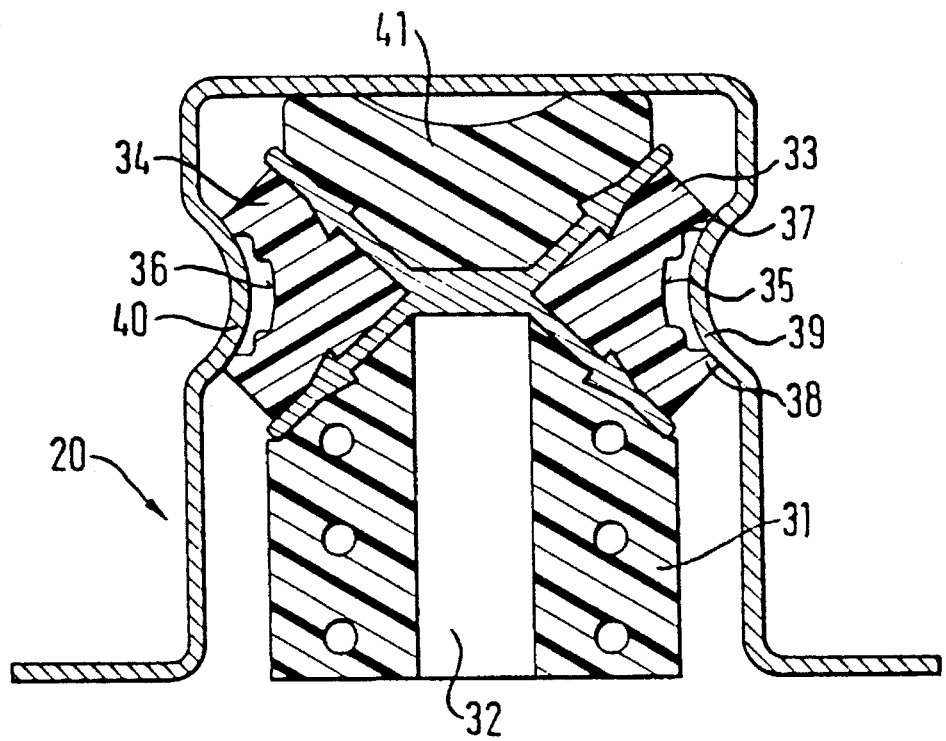
FIG. 6 is a longitudinal-sectional view of a modified embodiment of a mount.

FIG. 6 shows another structural option for such a mount. This mount has a greater overall height and a lower rubber support body 31 which has a central vertical recess 32 of square or circular cross section, so as to gain a softer spring characteristic curve. In contrast to the embodiment of FIG. 1, horizontal stops 33 and 34 shown herein likewise have lateral indentations 35 and 36 and defining protrusions 37 and 38 which are supported on the housing 20 on corresponding indentations 39 and 40. With such a construction, which is also achieved for an upper vertical stop 41 of the rubber bodies, a progressive characteristic curve is assured when the stops correspondingly come into play.

Figure 7:
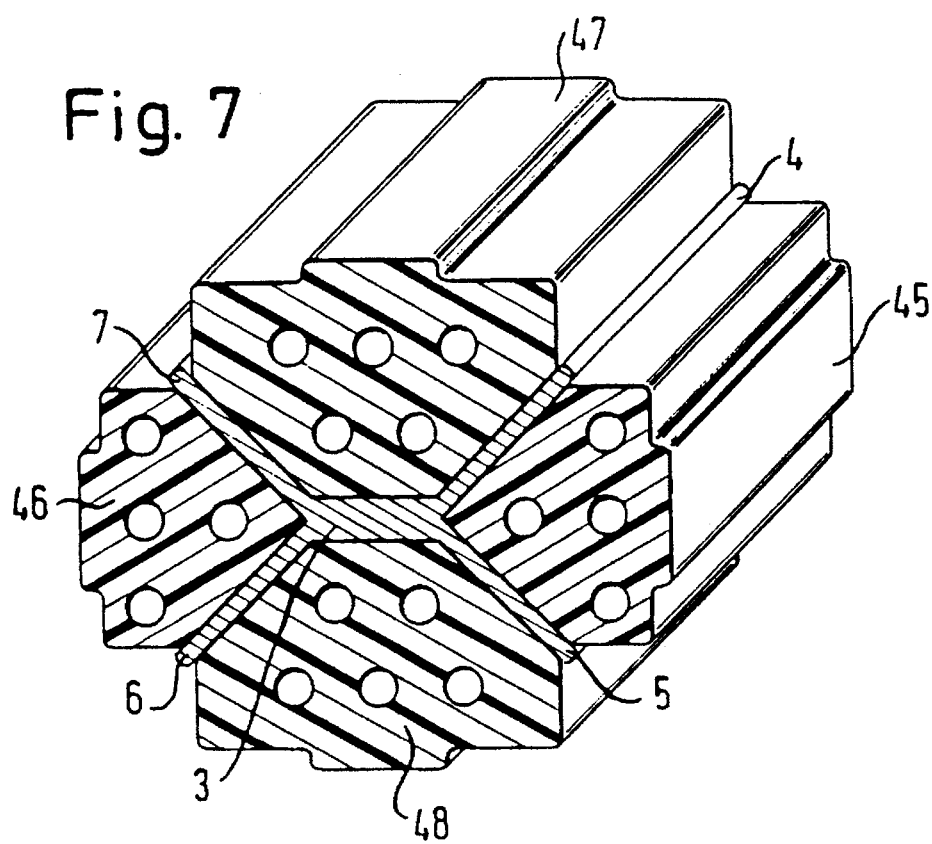
FIG. 7 is a perspective view of a mount with mirror-symmetrically identical rubber bodies.

FIG. 7 shows another structural option, in which the spring body is shown without any outer housing. Respective rubber bodies 45, 46 and 47, 48 that face one another each have the same cross section and the same configuration, and this makes manufacture and especially storage considerably simpler. If need be, the middle rib 3 of the support arm can be made narrower enough, or the contours at the transitions between the various projecting rigs 4, 5, 6 and 7 can be rounded off enough, to ensure that rubber bodies of uniform construction can be used for the entire spring.

In the exemplary embodiment shown in FIG. 8, a middle rib 50 of the support arm has only two lateral ribs 51 and 52 that are oriented obliquely downward and encompass a rubber support body 53. The middle rib 50 is provided with a longitudinally extending dovetail-like indentation 54. The two side walls 21 and 22 of the housing 20 also have corresponding dovetail-like bulges 55 and 56.

Identically constructed rubber bodies 57, 58 and 59 are then inserted into this dovetail-like indentation 54 and the corresponding bulges 55 and 56. These rubber bodies are shown separately again in perspective in FIG. 9. A rubber body 57 of this kind has an approximately hemispherical cross section with a dovetail base 60 attached centrally on the flat side, and it is provided laterally both with corresponding indentations 61 and 62 and with longitudinal channels 63 between them. At the same time, however, it is also possible to provide vertically extending hollow channels 64 to adjust the rigidity.

The thus constructed rubber bodies 57, 58 and 59, that are likewise cut to the desired length from an extruded profile section, are simply snapped in place in the dovetail-like grooves, indentations or bulges 54, 55 and 56 and thus form not only the lateral horizontal stops against the ribs 51 and 52 but also the vertical stop against the top 23 of the housing 20.

In FIG. 10, two other possible embodiments are shown, one in the left half and the other in the right half. A feature which is common to both embodiments is that ribs 66 and 67 protruding downward from a middle rib 65 of the support arm first extend obliquely inward and then obliquely outward, so as to form an undercut 68 for a rubber support body 69 to be inserted from below, and thus to assure a more-stable seat for this body.

As can be seen from the left half of the drawing, a lateral horizontal stop 70 is joined to an upper vertical stop 71 by a ligament 72 of material that encompasses an obliquely upward projecting rib 73 of the support arm. The non-illustrated right-hand horizontal stop may be joined to the vertical stop 71 in the same way, so that all three stops can be produced as an integral extruded longitudinal profile section, and then snapped onto the support arm by means of the two upward projecting ribs.

Another variant is shown in the right-hand half of FIG. 10. In this case a right-hand horizontal stop 74 has an extension 76, which surrounds an obliquely upward projecting rib 75 on all sides and due to its thickened structure assumes the function of the vertical stop, so that a total of only two structural parts are then needed for the two lateral stops and the vertical stop.

The overall result is an elastic mount for engine support, in which the actual rubber support body and the stops can be made from an extruded profile section and are merely snapped into the actual support arm, so that the entire mount can thus be recycled. Through varying the penetrations and hollow channels for the rubber support body and the stops, optimal distribution of tension and easy adjustment of the desired spring characteristic curve are attainable.

What is claimed is:

1. In a vehicle having an engine and a rigid abutment, an elastic mount, comprising:

a housing being open toward the engine and secured to the rigid abutment;

a support arm having an approximately cross-shaped cross section and laterally obliquely projecting ribs; and sections cut from a continuous extrudate forming elongated rubber bodies having a prismatic cross section, said rubber bodies being releasably disposed between said ribs for vertical and horizontal support, and said housing enclosing said rubber bodies.

2. The elastic mount according to claim 1, wherein said rubber bodies have continuous longitudinal channels formed therein.

3. The elastic mount according to claim 2, wherein said longitudinal channels have a circular cross section with at least one Venturi-like narrowing over the length thereof.

4. The elastic mount according to claim 2, wherein said longitudinal channels differ in diameter.

5. The elastic mount according to claim 1, wherein said support arm has a horizontal middle rib, said projecting ribs protrude laterally and obliquely upward and downward at an angle of 30° to 60° from the horizontal, and said middle rib has one end changing into a wider retaining flange for attachment of the engine.

6. The elastic mount according to claim 5, wherein said rubber bodies include a rubber support body on which said support arm rests, said rubber support body has a rectangular cross section, is supported directly on the abutment and has a top converging in wedge-like fashion and being inserted between said laterally downward-protruding ribs.

7. The elastic mount according to claim 6, wherein said rubber support body has a central vertical recess with a rectangular cross section formed therein.

8. The elastic mount according to claim 6, wherein said rubber support body has a central vertical recess with a circular cross section formed therein.

9. The elastic mount according to claim 5, wherein said housing has encompassing side walls, and said rubber bodies include two lateral rubber bodies in the form of horizontal stops having the same cross section, protruding laterally beyond said obliquely projecting ribs, and having lateral extensions resting on said encompassing side walls of said housing.

10. The elastic mount according to claim 5, wherein said rubber bodies include an upper rubber body being constructed as a vertical stop and having at least one extension protruding beyond said obliquely upward projecting ribs.

11. The elastic mount according to claim 1, wherein said rubber bodies are mutually opposed, have the same cross section and are inserted mirror-symmetrically relative to one another.

12. The elastic mount according to claim 5, wherein said housing has encompassing side walls, said rubber bodies include two lateral rubber bodies in the form of horizontal stops having the same cross section, protruding laterally beyond said obliquely projecting ribs, and having lateral extensions resting on said encompassing side walls of said housing, and said rubber bodies include an upper rubber body being constructed as a vertical stop and having at least one extension protruding beyond said obliquely upward projecting ribs, and said two lateral rubber bodies and said upper rubber body are joined together through a region of material encompassing said obliquely upward projecting ribs and being manufactured as an integral extruded profile.

13. The elastic mount according to claim 9, wherein said two lateral rubber bodies each have a respective one of said extensions as a vertical stop encompassing a respective one of said obliquely upward-projecting ribs.

14. The elastic mount according to claim 5, wherein said rubber bodies include a lower rubber support body, said two obliquely downward projecting ribs are initially oriented obliquely inward and then obliquely outward as seen from said middle rib, and said two obliquely downward projecting ribs have an upper region forming a dovetail-shaped indentation for said lower rubber support body.

15. An elastic mount for supporting an engine of a vehicle, comprising: a housing adapted to be attached to a rigid abutment in the vicinity of an engine of a vehicle and being open towards the engine; a supporting rubber support body disposed in said housing, a support arm extending into said housing, said support arm having a horizontal middle rib with a longitudinally extending, dovetail-like constriction and two laterally downward projecting ribs for inclusion of said supporting rubber support body, said housing having side walls and dovetail-like bulges each being formed on a respective one of said side walls, and sections cut from a continuous extrudate forming identically extruded elongated rubber bodies, said identical extruded rubber bodies being releasably inserted into said dovetail-like constriction as a vertical stop and into said bulges as horizontal stops, and said housing encompassing said supporting rubber support body and said elongated rubber bodies.

16. The elastic mount according to claim 15, wherein said extruded profiles have an approximately semicircular cross section with continuous longitudinal channels, lateral indentations and a central dovetail base.

17. The elastic mount according to claim 5, wherein said laterally obliquely projecting ribs have longitudinally extending extensions converging in an approximately arrowhead-like shape and engaging corresponding undercuts formed in said rubber bodies.

18. The elastic mount according to claim 16, wherein said rubber bodies are snapped in place between said projecting ribs.

19. The elastic mount according to claim 1, wherein said rubber bodies adhere between said ribs.

20. The elastic mount according to claim 5, wherein said ribs have an upper edge, and said support arm has a transversely extending partition between said two obliquely upward projecting ribs being flush with said upper edge of said ribs.

21. The elastic mount according to claim 1, wherein said support arm protrudes laterally from a drive assembly being supported by the mount in a motor vehicle.

22. The elastic mount according to claim 1, wherein said rubber bodies are braced directly against said projecting ribs and an inner wall surface of said housing.

23. The elastic mount according to claim 15, wherein said rubber bodies are braced against and between said projecting ribs and an inner wall surface of said housing.

\* \* \* \* \*